METHOD FOR PRODUCING IMPROVED EPITAXIAL FILMS

Filed Jan. 14, 1966

INVENTORS
MELVIN BERKENBLIT
ARNOLD REISMAN
BY
Thomas J. Kilgannon Jr.
ATTORNEY

United States Patent Office 3,476,592
Patented Nov. 4, 1969

3,476,592
METHOD FOR PRODUCING IMPROVED EPITAXIAL FILMS

Melvin Berkenblit and Arnold Reisman, Yorktown Heights, N.Y., assignors to International Business Machines Corporation, Armonk, N.Y., a corporation of New York Filed Jan. 14, 1966, Ser. No. 520,625
Int. Cl. B44d *1/18, 1/40*
U.S. Cl. 117—201 9 Claims

ABSTRACT OF THE DISCLOSURE

A process for enhancing the surface morphology of epitaxially grown semiconductive layers is disclosed. Smooth growth of epitaxial layers is insured by misorienting the crystallographic plane of a substrate relative to a major crystallographic plane. Specific orientations of semiconductor substrate which provide smooth epitaxially grown surfaces include 2–6° off the orientations [111]→[110], [100]→[110], [100]→[111], 8–25° off the [100]→[110] and 10–22° off [100]→[111]. The angle specified indicate the number of degrees of misorientation from a major crystallographic axis and the unique misorientation is further established by specifying the relationship of the misorientation to the nearest specified different major crystallographic axis. The process involved includes the steps of depositing a semiconductive material on a semiconductor substrate, the latter having one of the orientations specified above.

Figure 1A:
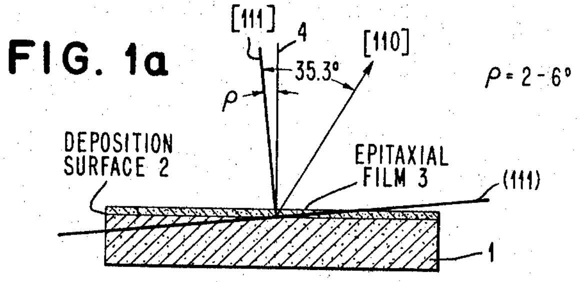

One of the major problems arising in the use of epitaxially grown semiconductor materials is that under certain growth conditions and crystallographic orientations, it is most difficult to obtain smooth surfaces which are free from pits and other surface imperfections. Such difficulty is most evident in disproportionation growth processes which occur at lower temperatures than with reduction or pyrolytic methods. Because of the nature of the epitaxial deposition process, surface imperfections present in a substrate are repeated in the subsequently deposited layer. Even where the surface on which deposition is to take place contains no obvious imperfections, it is often found that spurious overgrowths appear during deposition. Obviously, such growths affect the utility of the resulting deposition and depending on the density of the growths per unit area and the height, the resulting deposited material may be useless.

Heretofore, efforts to attain smooth, reproducible epitaxial films have been directed to controlling environmental parameters in the deposition system such as temperature, pressure, reactions, flow rates, etc. More often than not, any variation from a fixed regime affected the resulting film so that it was deficient in some way, i.e., non-uniform in thickness, contained unwanted growths.

More recently, it has been suggested that the crystallographic orientation of the substrate upon which deposition is to be made is an important consideration in the production of smooth epitaxial films. Thus in U.S. Patent 3,146,137 entitled "Smooth Epitaxial Compound Films Having a Uniform Thickness by Vapor Depositing on the (100) Crystallographic Plane of the Substrate" and assigned to Monsanto Company, it is indicated that when crystal faces other than the (100) are employed, the epitaxial films deposited are rougher, more non-uniform in thickness and less reproducible. This patent further indicates that even when using the desired (100) for deposition thereon, mis-orientation of as little as 0.5 degree from the (100) plane gives rise to detectable structural features on the surface of the epitaxial film and that deviations from the precise (100) plane are to be avoided. This effect is apparently so pronounced that epitaxial deposition of smooth epitaxial films can be accomplished by any deposition process as long as the seed crystal substrate is oriented in the (100) crystal face exposure. The foregoing is indicative of the effect of substrate orientation on the usefulness and reproducibility of epitaxially deposited films. Since most processes in the production of integrated semiconductor circuits depend from the very outset on the condition of the substrate surfaces obtained after deposition, any method or means which would affect the surface conditions of epitaxial films to make them smooth, polished and reproducible would find immediate utility and acceptance in the semiconductor art.

It is, therefore, an object of this invention to provide a method and means whereby the surface characteristics of epitaxially deposited semiconductor films are enhanced.

Another object is to provide a method and means for producing epitaxial deposits which are reproducible and amenable to mass production techniques.

Another object is to provide a substrate having a misorientation from a major crystallographic plane which permits the deposition of smooth, epitaxial films having a minimal amount of spurious overgrowths.

Another object is to provide a method for epitaxially growing smooth films by epitaxially depositing semiconductor material on the surface of a substrate which is misoriented in a given way from a major crystallographic orientation.

Still another object is to provide a method and means for producing improved epitaxial films which is in opposition to the teaching of known prior art.

The foregoing and other objects, features and advantages of the invention will be apparent from the following more particular description of preferred embodiments of the invention, as illustrated in the accompanying drawings.

In the drawings:

FIG. 1*a* is a cross-sectional view of a semiconductor substrate having an epitaxially deposited film on a surface thereof which is mis-oriented 2–6° off the [111] orientation toward the nearest [110] orientation.

Figure 1B:
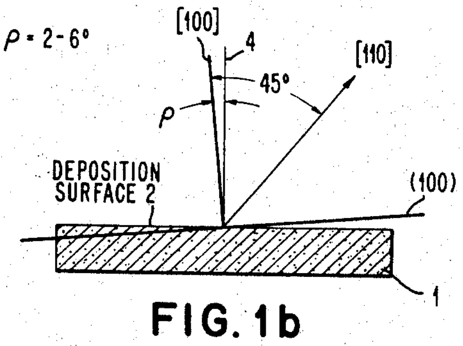

FIG. 1*b* is a cross-sectional view of a semiconductor substrate, the upper surface thereof having an orientation 2–6° off the [100] orientation toward the nearest [110] orientation.

Figure 1C:
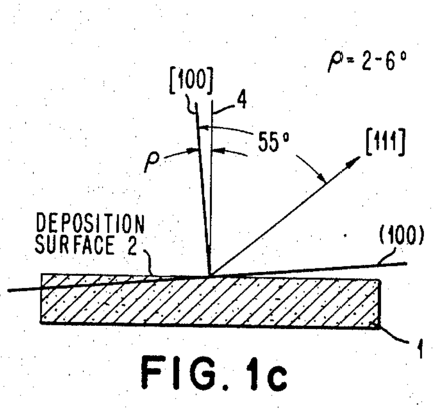

FIG. 1*c* is a cross-sectional view of a semiconductor substrate, the upper surface thereof having an orientation 2–6° off the [100] orientation toward the nearest [111] orientation.

Figure 1D:
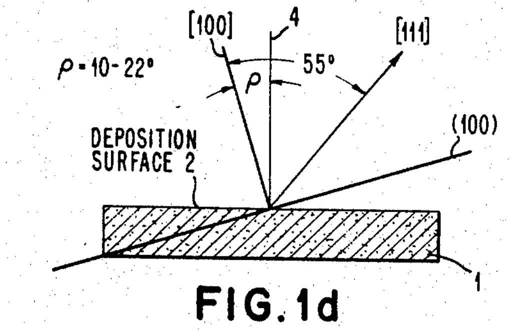

FIG. 1*d* is a cross-sectional view of a semiconductor substrate, the upper surface thereof having an orientation 10–22° off the [100] orientation toward the nearest [111] orientation.

Figure 1E:
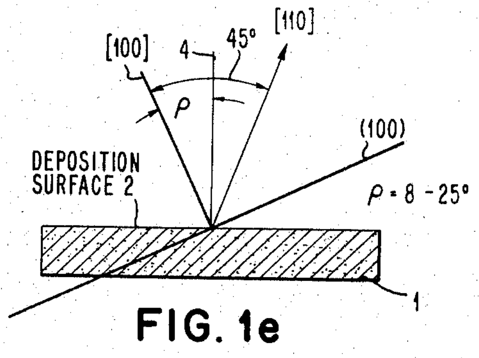

FIG. 1*e* is a cross-sectional view of a semiconductor substrate, the upper surface thereof having an orientation 8–25° off the [100] orientation toward the nearest [110] orientation.

In accordance with the present invention, substrates of semiconductor material such as germanium and gallium arsenide which are mis-oriented from major crystallographic planes are provided for use in epitaxial deposition systems and the resulting epitaxial films have improved surface morphologies. Thus, substrates are provided which are mis-oriented from the (100) and (111) planes. Specifically, the surface of a substrate upon which a film is to be epitaxially deposited is mis-oriented 2–6° off one of the orientations [111]→[110], [100]→[110], [100]→[111], 10–22° off the orientation [100]→[111] and 8–25° off the orientation [100]→[110]. The foregoing orientations accurately define the orientation of a surface of a substrate to one skilled in the art of crystallography and such designations are particularly meaningful when used in conjunction with charts called "Cubic Standard Projection" manufactured by N. P. Nies, Laguna Beach, California. Projections such as the "Cubic (111) Standard Projection" and the "Cubic (100) Standard Projection" are available. In these projections, the orientation [111]→[110] is read as the [111] orientation toward the closest [110] orientation. By providing substrates having a surface with one of the mis-orientations referred to above, it is possible to obtain epitaxial films which have an improved surface relative to surfaces obtained using substrates that are directly on a major crystallographic orientation (i.e. [111], [100], [110]).

As indicated hereinabove, one of the major difficulties in epitaxial deposition processes is in producing on a repetitive basis smooth films which are free from surface imperfections such as "pyramid shaped" growths referred to in the prior art.

These growths or imperfections appear to be due in large measure to the crystallographic orientation of a surface upon which epitaxial deposition is to be made and appear to be susceptible of control or even substantial elimination by adhering to the teaching of the present invention. An article entitled "Substrate Orientation Effects and Germanium Epitaxy in an Open Tube HI Transport System" by A. Reisman and M. Berkenblit which appeared in the Journal of the Electrochemical Society, vol. 112, No. 3, March 1965, briefly discussed experimental approaches which indicated that crystallographic orientation of a substrate can have a major effect on the surface condition of a subsequently deposited epitaxial layer.

Referring now to FIG. 1*a*, there is shown a semiconductor substrate 1, which may consist of germanium or gallium arsenide or other suitable semiconductor. Substrate 1 has a deposition surface 2, the orientation of which determines the surface morphology of a subsequently deposited epitaxial film 3 of semiconductor material. The epitaxial film may consist of germanium, gallium arsenide or other suitable semiconductor material and the substrate of the same or compatible composition. In FIG. 1*a*, the designation (111) refers to the (111) crystallographic plane seen edge-on. A perpendicular to the (111) plane is designated [111]. The (111) plane and the perpendicular [111] comprise a frame of reference from which the mis-orientation of surface 2 may be measured. A perpendicular 4 from surface 2 along with perpendicular [111] defines the angle $\rho$ which is the deviation of surface 2 from the (111) plane. In FIG. 1, $\rho$ may vary over a range of 2–6°, and an improved epitaxial film surface relative to that obtained by deposition directly on a major crystallographic plane is obtained. A preferred orientation for deposition is $\rho=4°$. Because of three dimensional considerations involved, the deviation from a particular plane is not accurately defined unless some further information is given indicating the direction of the deviation. Accordingly, a perpendicular to the (110) plane designated [110] is shown in FIG. 1*a* displaced 35.3° from the [111] perpendicular. The mis-orientation of deposition surface 2 is thereby accurately defined and may be designated as 2–6° off the [111] orientation toward the nearest [110] orientation. Another way to accurately define any of the orientations referred to is to use the "Cubic Standard Projections" referred to hereinabove. In these the angles $\rho$ and $\phi$ are used. $\phi$ is the azimuthal angle defined by (a) a line joining a projection of reference perpendicular and the projection of a perpendicular from a plane misoriented from a reference plane by the angle $\rho$ and (b) by a line joining the projection of reference perpendicular and the projection of a perpendicular from another desired nearest major orientation.

FIGS. 1*b* and 1*c* are semiconductor substrates similar to that shown in FIG. 1*a* with the exception that the deposition surface 2 is mis-oriented differently. In these figures, the angular displacements (45° and 55°) between the perpendiculars to the (100) and (110) planes and the (100) and (111) planes, respectively, are those which result from the crystalline structure of the semiconductor material.

FIGS. 1*d* and 1*e* are different from FIGS. 1*c* and 1*b* in that the range of $\rho$ is different. In FIG. 1*d*, $\rho$ may vary from 10–22°, and in FIG. 1*e*, $\rho$ may vary between 8–25°, preferably 25°.

Using the preferred value of $\rho$ of 4° in FIGS. 1*a*–1*b*, the epitaxial films 3 deposited on surfaces 2 show a matte finish and are free from spurious overgrowths. In FIG. 1*c*, the epitaxial film 3 on surface 2 is smooth and shiny and free from spurious overgrowth. In any event, even the first mentioned films provide superior surfaces to those obtained using depositions directly on a major crystallographic orientation. The same holds true for films deposited on substrates having orientations as shown in FIGS. 1*d* and 1*e*, the best surfaces being obtained on the preferred $\rho$'s of 18° and 25°, respectively, in most cases.

Until this point, nothing has been said about the conditions under which the epitaxial deposition of film 3 takes place. It has been found that the spurious overgrowths which affect the utility of epitaxial films are most manifest at deposition temperatures in the 300–400° C. range, using the germanium di-iodide open-tube disproportionation systems. In such systems, the deposition specie upon encountering the relatively low temperature environment disproportionates and deposits pure semiconductor material on a substrate. One such system has been described in a co-pending application entitled "Epitaxial Deposition of Semiconductor Material" in the names of A. Reisman, M. Berkenbilt, S. A. Papazian and G. Cheroff, Serial Number 490,814, filed September 28, 1965 and now Patent No. 3,345,223. Using the technique described therein, germanium may be deposited on substrate of germanium or gallium arsenide or other suitable semiconductor material.

In addition to the observation of spurious growths at low deposition temperatures in disproportionation systems, orientation effects have been observed in other epitaxial deposition processes and at dilute reactant concentrations such as reduction and pyrolytic decomposition processes at temperatures at the lower end of their usual deposition range, i.e., 500° C. At the higher temperatures at which such depositions normally are made, the orientation effects are not observable and are apparently overcome by the effects of temperature and fast growth rates.

With respect to other factors, the surface morphology of the resulting epitaxial films is not affected by the fact that the substrate or the material to be deposited are doped or undoped.

The substrates used in accordance with the present invention may be obtained from a single crystal of the semiconductor chosen which has been grown by any method well known to those skilled in the art of crystal growing. The crystals were grown in such a manner as to provide a desired starting crystallographic orientation. Any one of the orientations in the range of 2–6° off one of the orientations [111]→[110], [100]→[110], and [100]→[111], or 10–22° off the orientation

[100]→[111]

or 8–25° off the orientation [100]→[110] can be utilized to provide a substrate which will affect the surface characteristics of a subsequently deposited film.

After slicing substrates having the desired mis-orientation from the single crystal, the substrate or wafers are lapped to a uniform thickness with a succession of $Al_2O_3$ grit sizes of 9.5, 5 and 3 microns and then polished with 0.3 $Al_2O_3$ (Linde A) followed by a 0.05 m. (Linde B) final polish. At this point the substrates exhibit a high polish but are surface damaged.

After mechanical polishing, the wafers are ultrasonically cleaned in de-ionized water. Immediately prior to use, the substrate or wafers are etched in a 5:1 $HNO_3HF$ solution for thirty seconds rinsed in di-ionized water, ethyl alcohol and dried in a stream of warm nitrogen. The wafers are then placed within a deposition chamber and subjected to a hydrogen iodide cleaning etch at 365° for 15 minutes to remove surface oxides. As an alternative to the hydrogen iodide etch, the lapped substrates may be subjected to a mechanical-chemical polishing technique which is described in a co-pending application entitled "Chemical Processing of a Substrate" in the name of A. Reisman and R. L. Rohr, Serial Number 356,793 filed April 4, 1964 now Patent 3,342,652 and assigned to the same assignee as the present invention. After preparing as described above, the substrates oriented in accordance with the teaching of this invention are suitable for subsequent epitaxial growth and the resulting films will exhibit surfaces which are smoother than surfaces obtained directly on major crystallographic orientations.

EXAMPLE I

This example illustrates the formation and deposition of an epitaxial film of germanium on a substrate of germanium. The surface of the substrate upon which deposition takes place is oriented in the range of 2–6°, preferably 4°, off one of the orientations [111]→[110], [100]→[110], [100]→[111] or 8–25° off [100]→[110], preferably 25° or 10–22° off [100]→[111] preferably 18°.

The substrate is introduced into the deposition region of an open tube disproportionation system similar to that shown in a co-pending application entitled "Epitaxial Deposition of Semiconductor Material" in the names of A. Reisman, M. Berkenblit, S. A. Papazian and G. Cheroff, Serial Number 490,814 filed September 28, 1965 and now Patent No. 3,345,223, and assigned to the same assignee as the present invention. Briefly, the deposition specie is obtained by flowing hydrogen iodide and a mixture of hydrogen and helium through a source of crushed germanium at a temperature in the range of 550° C. to 900° C. The deposition specie $GeI_2$ along with other reaction products ($GeI_4$) is carried to the deposition site where, at a temperature in the range of 300° C. to 400° C., the $GeI_2$ disproportionates depositing pure germanium epitaxially on the exposed surface of the substrate. The appearance of the resulting epitaxial film, if the substrates are oriented in accordance with the teaching of the present invention, will vary depending on the orientation chosen from matte to smooth, and shiny and free from spurious overgrowths.

EXAMPLE II

This process is the same as that described in Example I with the exception that a substrate of gallium arsenide is substituted for the substrate of germanium. The gallium arsenide substrate has a surface which contacts with deposition specie which is oriented 2–6° off one of the orientations [111]→[110], [100]→[110], [100]→[111], or 8–25° off [100]→[110] or 10–22° off [100]→[111]. In this manner, an epitaxial film of germanium is deposited on a gallium arsenide substrate which has enhanced surface characteristics relative to films obtained when substrates which are not oriented in accordance with the teaching of this invention are used.

EXAMPLE III

This example illustrates the formation and deposition of an epitaxial film of gallium arsenide on a substrate of germanium. The surface of the substrate upon which deposition is to take place may have any one of the orientations alluded to in the above examples.

The appropriately oriented germanium slice is introduced into the deposition region of an open tube disproportionation system similar to that shown in an article entitled "Synthesis of GaAs by Vapor Transport Reaction" by H. R. Leonhardt and published in the Journal of the Electrochemical Society, vol 112, No. 2, February 1965. Briefly, the method shown in the paper, the deposition species is obtained from separate gallium and arsenic sources. The arsenic is transported in elemental form in a separate line. In another portion of the apparatus, iodine is evaporated and converted to hydrogen iodide which subsequently reacts with gallium to form gallium iodides. The arsenic and gallium iodide in the vapor phase are mixed in a mixing chamber at a temperature sufficient to prevent formation of GaAs. The vapor phase mixture of the elements to be deposited is then transported to a deposition region where, at a temperature sufficient to cause a disproportionation reaction, gallium arsenide is deposited epitaxially on the desired surface of the germanium substrate. Deposition temperatures in the range of 600–750° C. are useful. The appearance of the resulting epitaxial films, if the substrates are oriented in accordance with the teaching of the present invention, will vary depending on the orientation chosen from a matte finish to smooth and shiny and free from spurious overgrowths.

EXAMPLE IV

This process is the same as that described in Example III with the exception that a substrate of gallium arsenide is substituted for the substrate of germanium. The orientations which may be used are the same as shown in connection with Example 1. While the orientation 8–25° off [100]→[111], show enhanced surface morphology over the whole range of 8–25°, the best surfaces were obtained in this range over a preferred range of 10–15°. Within the preferred range, an angular misorientation of 13° off [100]→[111] provides a surface which is smooth, shiny and free from spurious overgrowths.

What is claimed is:

1. A process for epitaxially depositing semiconductor material on a semiconductive substrate of a material selected from the group consisting of germanium and gallium arsenide, from the vapor phase, the improvement comprising the step of mis-orienting the crystallographic orientation of a surface of said substrate to one of the orientations selected from the group consisting of 2–6° off the orientations [100]→[110], [100]→[111], 8–25° off [100]→[110], and 10–22° off [100]→[111].

2 A process for epitaxially depositing semiconductive material on a substrate of a material selected from the group consisting of germanium and gallium arsenide, which comprises the steps of introducing a mixture containing said semiconductive material in the vapor phase in the region of said substrate and contacting a surface of said substrate with said mixture for deposition of said semiconductive material thereon said surface having a crystallographic orientation selected from the group consisting of 2–6° off one of the orientations [100]→[110], [100]→[111], 8–25° off [100]→[110] and 10–22° off [100]→[111].

3. A processs according to claim 2 wherein said semicoductive material includes semiconductive material selected from the group consisting of gallium arsenide and germanium.

4. A process for epitaxially depositing semiconductive material on a substrate of a material selected from the group consisting of germanium and gallium arsenide, which comprises the steps of introducing a mixture containing said semiconductive material in the vapor phase in the region of said substrate and contacting a surface of said substrate with said mixture at a temperature sufficient to cause deposition of said semiconductor by a disproportionation reaction on said surface, said surface having a crystallographic orientation selected from the group consisting of 2–6° off the orientation [100]→[110], [100]→[111], 8–25° off [100]→[110] and 10–22° off [100]→[111].

5. A process according to claim 4 wherein said temperature sufficient to cause deposition includes the temperature range of 300–750° C.

6. A process for epitaxially depositing semiconductor material selected from the group consisting of germanium and gallium arsenide on a substrate of semiconductor material selected from the group consisting of germanium and gallium arsenide, which comprises the steps of introducing a mixture containing said semiconductor material in the vapor phase in the region of said substrate and contacting a surface of said substrate with said mixture for deposition of said semiconductor thereon said surface having a crystallographic orientation 4° off one of the orientations [100]→[110], [100]→[111], and 25° off [100]→[110].

7. A process for epitaxially depositing germanium on a substrate of gallium arsenide which comprises the steps of introducing a mixture containing said semiconductor material in the vapor phase in the region of said substrate and contacting a surface of said substrate with said mixture for deposition of said semiconductor thereon said surface having a crystallographic orientation 18° off the orientation [100]→[111].

8. A process for epitaxially depositing gallium arsenide on a gallium arsenide substrate which compises the steps of introducing a mixture containing gallium and arsenic in the vapor phase in the region of said substrate and contacting a surface of said substrate with said mixture for deposition of gallium arsenide thereon said surface having a crystallographic orientation 10–15° off [100]→[111].

9. A process according to claim 8 wherein said surface has a crystallographic orientation 13° off [100]→[111].

References Cited

UNITED STATES PATENTS

| | | | |
|---|---|---|---|
| 3,325,314 | 6/1967 | Allegretti | 148—175 |
| 3,379,584 | 4/1968 | Bean et al. | 148—175 |

WILLIAM L. JARVIS, Primary Examiner

U.S. Cl. X.R.

117—106; 148—1.6; 161—164